United States Patent [19]

Nowobilski et al.

[11] Patent Number: 4,515,397
[45] Date of Patent: May 7, 1985

[54] VACUUM INSULATED CONDUIT

[75] Inventors: Jeffert J. Nowobilski, Orchard Park; Kenneth C. Kather, Tonawanda, both of N.Y.

[73] Assignee: Union Carbide Corporation, Danbury, Conn.

[21] Appl. No.: 481,237

[22] Filed: Apr. 1, 1983

[51] Int. Cl.³ .............................................. F16L 59/14
[52] U.S. Cl. ......................................... 285/47; 285/53; 285/DIG. 5; 138/149
[58] Field of Search ........... 285/47, 227, 226, DIG. 5, 285/53; 138/149, DIG. 2

[56] References Cited

U.S. PATENT DOCUMENTS

| 1,565,254 | 12/1925 | Bystrom . | |
|---|---|---|---|
| 2,478,552 | 8/1949 | Williamson | 138/149 |
| 2,930,407 | 3/1960 | Conley et al. | 138/64 |
| 3,068,026 | 12/1962 | McKamey | 285/47 |
| 3,146,005 | 8/1964 | Peyton | 285/47 |
| 3,207,533 | 9/1965 | Van Gundy et al. | 285/31 |
| 3,344,803 | 10/1967 | Charles et al. | 137/375 |
| 3,369,826 | 2/1968 | Boosey et al. | 285/47 |
| 3,488,067 | 1/1970 | Sommer | 285/47 X |
| 3,744,823 | 7/1973 | Muir et al. | 285/47 X |
| 3,854,756 | 12/1974 | Couch | 285/47 |
| 3,885,595 | 5/1975 | Gibson et al. | 285/47 X |
| 4,046,407 | 9/1977 | Porreco | 285/47 X |
| 4,332,401 | 6/1982 | Stephenson et al. | 138/149 X |
| 4,415,184 | 11/1983 | Stephenson et al. | 138/149 X |

FOREIGN PATENT DOCUMENTS 2465947  4/1981  France ................................ 285/47

Primary Examiner—Thomas F. Callaghan
Attorney, Agent, or Firm—Stanley Ktorides

[57] ABSTRACT

A vacuum insulated conduit exhibiting reduced thermal leakage through a joint area wherein the evacuated space between inner and outer pipes is reduced in the joint area by a plate from the outer pipe to bellows covering the inner pipe which form the major heat transfer pathway.

18 Claims, 4 Drawing Figures

VACUUM INSULATED CONDUIT

DESCRIPTION

1. Technical Field

This invention relates, in general, to insulated conduits and more particularly to conduits insulated, at least in part, by vacuum.

2. Background Art

Insulated conduits are used in a wide variety of applications to transport a fluid having a temperature which differs markedly from ambient such that the fluid retains to as great an extent as possible its desired temperature characteristics during the transport. Specific examples of such applications are the transport of liquified gases and the transport of molten solids.

An often-used type of insulated conduit is one wherein the insulation is achieved, at least in part, by a vacuum.

Typically such a conduit comprises concentric inner and outer pipes wherein the fluid flows in the inner pipe and the space between the pipes is evacuated to provide insulation from ambient conditions. Commercial embodiments of such double-walled conduits often employ multilayer laminar radiation shielding between the walls.

In order to insure that the conduit has the requisite axial flexibility and also to aid in the ease of construction and handling of the conduit, couplings are spaced approximately every thirty feet of fluid transfer conduit.

Such couplings are notorious sources of thermal leak especially for vacuum insulated conduits where vacuum loss in the connector area may be severe. Consequently it is often necessary to fabricate such couplings with expensive materials and complicated methods of construction, such as in the construction of a bayonet joint.

Accordingly it is an object of this invention to provide an improved vacuum insulated conduit.

It is another object of this invention to provide an improved vacuum insulated conduit which exhibits reduced thermal leakage over that exhibited by heretofore available vacuum insulated conduit when the vacuum is degraded.

It is yet another object of this invention to provide an improved vacuum insulated conduit having an end area which can easily be joined to a similar end area to form a joint having good thermal resistance characteristics.

It is a further object of this invention to provide an improved vacuum insulated conduit which can be fabricated from relatively inexpensive materials.

It is another object of this invention to provide an improved vacuum insulated conduit which requires relatively less labor to fabricate than heretofore available conduits.

SUMMARY OF THE INVENTION

The above and other objects which will become apparent to one skilled in the art upon a reading of this disclosure are attained by:

A conduit having reduced thermal leakage at a joint area comprising:

(A) a first pipe having an end thereof;

(B) a second pipe having a diameter greater than that of said first pipe, positioned circumferentially around and axially along said first pipe, terminating at a point short of said first pipe end to define an axial distance from said point to said first pipe end;

(C) bellows, attached at one axial end thereof to said first pipe, having a diameter greater then that of said first pipe but less than that of said second pipe, positioned circumferentially around and axially along said first pipe along at least a part of said axial distance; and (D) a plate having a solid radial dimension from the furthest radial extent of said bellows to said second pipe, substantially perpendicular to said pipes and connecting said bellows, at the other axial end thereof, with said second pipe.

As used herein the term "vacuum" is used to define a volume having a pressure less than atmospheric.

As used herein the term "bellows" is used to mean a metal cylinder which has a thin convoluted wall allowing the cylinder to be extended or compressed along its axis.

DETAILED DESCRIPTION

This invention is an insulated conduit wherein insulation is obtained, at least in part, by a vacuum space between the transported fluid and the ambient conditions. By ambient conditions, it is meant any conditions exterior of the outer concentric pipe, and not necessarily atmospheric conditions. The vacuum insulated conduit of this invention exhibits greatly improved thermal resistance over that attained by conventional commercially available vacuum insulated conduits especially when the vacuum is degraded. This improved thermal resistance is attained by means comprising a novel conduit end area configuration which reduces heat transfer around the end area when the end area is joined to another such end area to form a conduit joint or connection. The novel end area configuration is easily constructed and can be easily joined to another such end area to quickly and conveniently form a joint. The end area configuration also allows one to employ inexpensive insulation, such as is normally employed only for atmospheric insulation purposes, to pack the evacuated area of the joint. Furthermore, the end area configuration allows one to achieve improved insulation at lesser degrees of vacuum leading to even further cost savings.

The vacuum insulated conduit of this invention will be described in greater detail with reference to the drawings.

Figure 2:
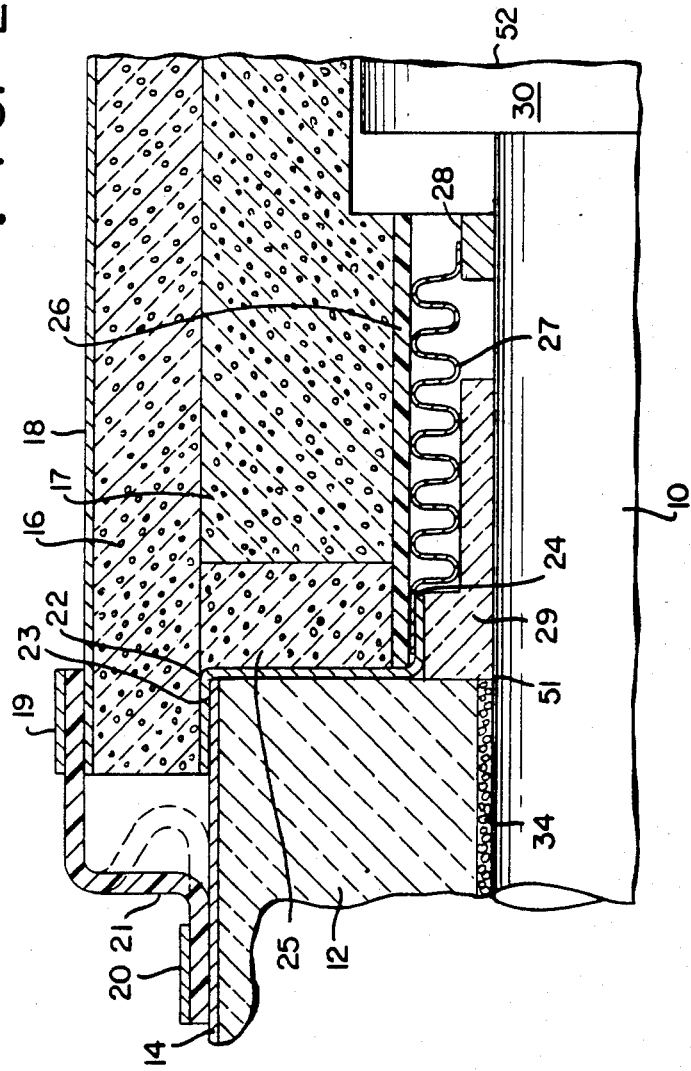
FIG. 2 is a cross-sectional view of one embodiment of the vacuum insulated conduit of this invention.

Referring now to FIG. 2, there is shown inner or first pipe 10, through which fluid is transported, and outer or second pipe 14, circumferentially around and axially along pipe 10 but ending at a point 51 short of the first pipe end 52 so as to define an axial distance from 51 to 52. Bellows 27 are positioned circumferentially around and axially along the axial distance between point 51 and end 52 and joined to first pipe 10 at their axial end nearer pipe end 52 such as by a butt weld at 28. Circular plate 22 is positioned essentially perpendicular to the pipes and has a solid radial dimension from the furthest radial extent of bellows 27 as at 24 to the second pipe 14. Plate 22 is connected to pipe 14, as at 23, and bellows 27, as at 24.

The space between first pipe 10 and second pipe 14 is evacuated. Preferably the space is filled with insulation 12 which may be open-celled or fibrous insulation such as would conventionally be employed only at atmospheric pressure and would not normally be deemed suitable for vacuum type insulation duty. The vacuum space may be at any suitable pressure from atmospheric to one micron of mercury or less. However, as will be shown more clearly later, the benefits of the conduit of this invention are more beneficially attained when the space is at a pressure of from 1 micron of mercury to atmospheric, and preferably from 10 to 100,000 microns of mercury. The vacuum space may also contain adsorbent 34, such as activated carbon molecular sieve or the like, which can serve as the primary or supplementary means to attain the vacuum and can serve as a means of maintaining the vacuum by absorbing gas introduced to the space by leak or material outgassing.

Plate 22 and bellows 27 cooperate to sharply reduce thermal leak from the conduit from the area proximate the end which would serve as one-half of a conduit joint. Plate 22 and bellows 27 act to effectively reduce the evacuated volume in the vicinity of a joint such that a degradation in vacuum does not have nearly as severe an impact on heat transfer resistance as would occur with conventional vacuum insulated conduits. Plate 22 and bellows 27 also act to reduce heat leak in the joint area by their configuration which requires heat transfer to occur essentially only along the path from the point where bellows 27 are attached to first pipe 10 at 28 to the point where plate 22 is attached to second pipe 14 at 23, along the surface of plate 22 and bellows 27. For example, when liquefied gases are transported through first pipe 10, this pipe is at a cold condition and pipe 14 is essentially at ambient temperature. Conductive heat transfer to the cryogenic liquid can occur essentially only from point 23 along plate 22 and the convoluted surface of bellows 27 to point 28 and through pipe 10 to the liquid. This conductive heat transfer is considerably constrained by the configuration of this invention while convective heat transfer along the pipe length is constrained by vacuum and insulation. Bellows 27 also function to provide axial flexibility to the conduit which is necessary when the temperature differential from inside pipe 10 to outside pipe 14 is substantial.

In order to enhance the insulating qualities of the conduit of this invention, the joint area is preferably packed with insulation. Referring again to FIG. 2, insulation 29, which may be molded fiberglass, occupies the evacuated space between bellows 27 and pipe 10 thus inhibiting radial heat transfer. Mat wrap 26, which may be of fiberglass or the like, encircles bellows 27 inhibiting convective heat transfer to or from the bellows area and along the length of the bellows. The joint area is enclosed by insulation sections 16 and 17 which is preferably rigid closed-cell urethane foam. Insulation collar 25, preferably made of molded, closed-cell flexible foam is preferably adhesive-bonded to plate 22 and disposed between plate 22 and insulation 17 to provide axial flexibility. Alternatively, mat wrap 26 could be wound in layers to take up the entire space occupied by insulation section 16 and 17. This arrangement is preferable when liquid oxygen is the fluid being transported to avoid material compatibility problems. Sleeve 18, which is preferably made of aluminum, encloses the joint area and is secured to pipe 14 by flexible water-impermeable seal 21 which is elastomeric and held in place by compression bands 19 and 20. FIG. 2 illustrates a preferred embodiment wherein the end of pipe 10 is outfitted with flange 30 which facilitates joining the end with another such end to form a joint. Alternatively the pipe end could be welded to another such end.

Fiberglass is the preferred insulation for the insulation between the pipes. Other suitable types of insulation include phenolic foam and perlite.

Outer pipe 14 is preferably constructed of aluminum which has adequate strength and is not expensive. Other suitable materials for outer pipe 14 include carbon steel or another metal alloy or a non-metal such as polyethylene.

Inner pipe 10 is preferably constructed of stainless steel although any other conduit material compatible with the fluid to be transported through pipe 10 is suitable.

Bellows 27 are preferably metal and most preferably stainless steel.

Metal plate 22 is preferably of aluminum and is connected to components of similar material by a weld and to components of dissimilar material by suitable adhesive.

The axial length of bellows 27 is a matter of design within the capability of one skilled in the art. The longer is the axial length of bellows 27 the greater is the axial flexibility of the conduit and the greater is the conductive axial heat transfer resistance. However, radial convective or radiation heat transfer around the bellows area increases with bellows axial length. The radius of the bellows may be any suitable radius although it is preferable that the radius be only sufficiently greater than that of the inner pipe to allow for insulation section 29 between the bellows and the inner pipe. Preferably the distance between the inner pipe and the bellows is less than 25 percent of the distance between the inner and outer pipes, most preferably from 5 to 20 percent. The amplitude of each convolution of the bellows is generally specified by the bellows manufacturer for each standard pipe size.

The bellows convolution frequency will depend on the degree to which axial flexibility is required. The greater the axial flexibility required the more convolutions per linear dimension which will be needed.

It has been found that a bellows length of from 1 to 12 inches, preferably from 1.5 to 6 inches will minimize the heat transfer through the conduit joint.

Figure 3:
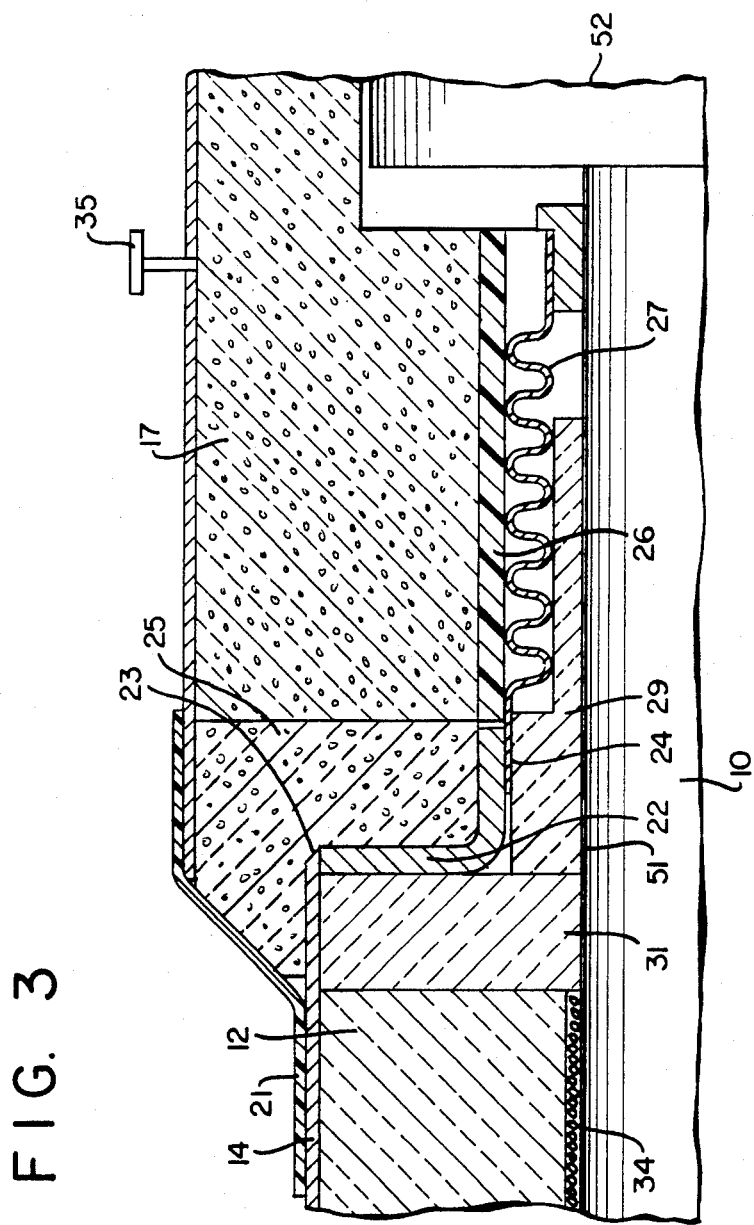
FIG. 3 is a cross-sectional view of another embodiment of the vacuum insulated conduit of this invention.

FIG. 3 illustrates another embodiment of the vacuum insulated conduit of this invention. The numerals correspond to those of FIG. 2 for the elements common to both. This embodiment shows plate 22 welded to pipe 14 and adhesive bonded to bellows 27. Seal 21 is shown as an adhesive-backed heat shrink plastic seal eliminating the need for compression bands. High density fiberglass disk 31 is provided to help center inner first pipe 10 within outer second pipe 14. Valve 35 is shown which may be used to evacuate the joint area or to fill the area up to atmospheric pressure with a low conductivity gas such as carbon dioxide or argon.

Figure 1:
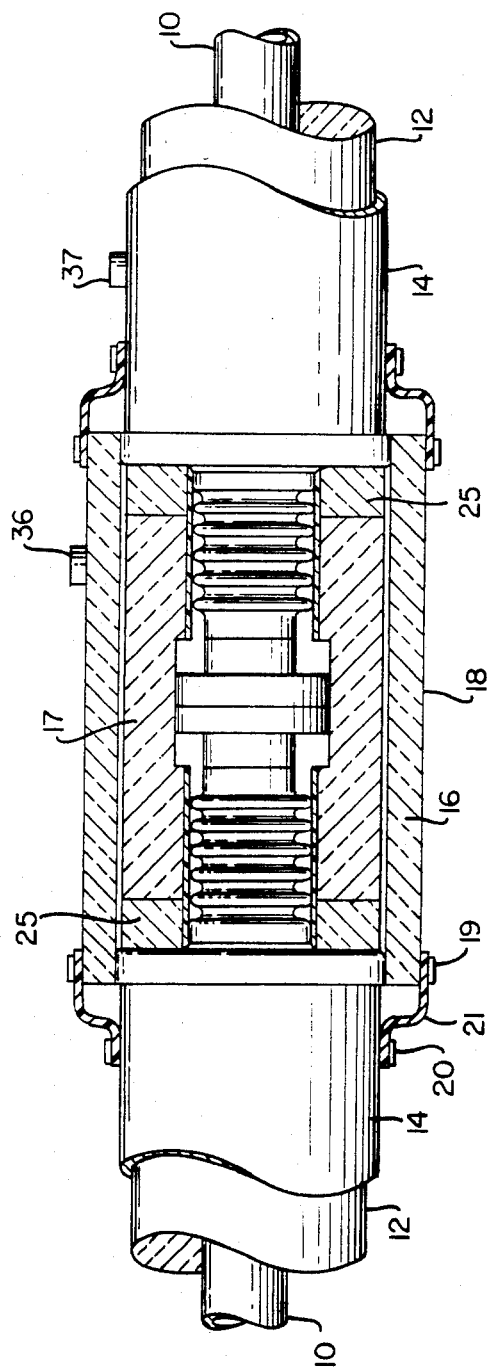
FIG. 1 is a cut away view, partly in cross-section, of the vacuum insulated conduit of this invention connected to another such conduit.

FIG. 1 illustrates the vacuum insulated conduit of this invention joined to another such conduit at their respective end areas to form a conduit joint. The numerals of FIG. 1 correspond to those of FIG. 2 for the common elements. Relief valves 36 and 37 are provided to release excessive pressure in case of inner pipe 10 or joint failure.

Figure 4:
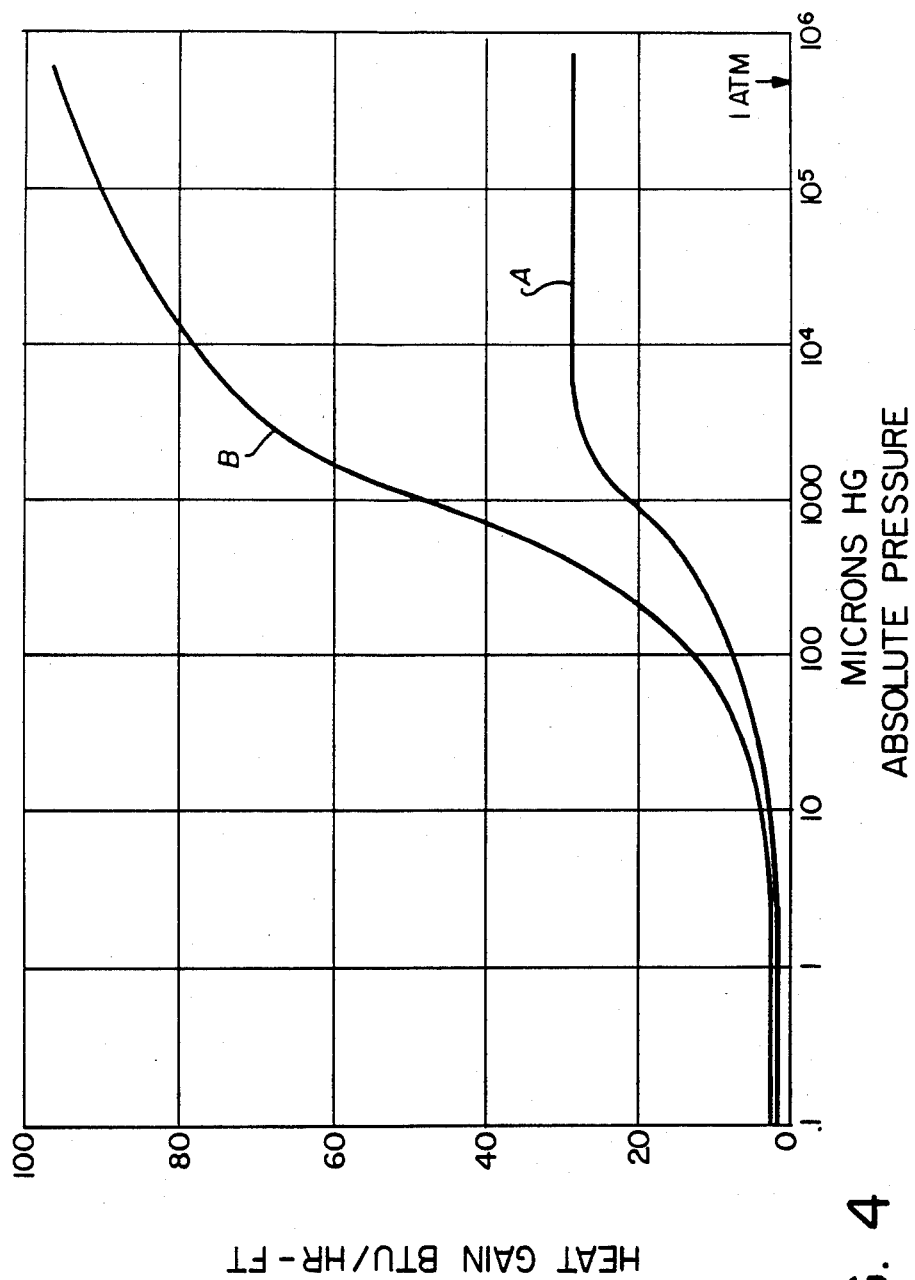
FIG. 4 is a graphical representation of the thermal performance characteristics of the vacuum insulated conduit of this invention and also of a conventionally employed commercially available vacuum insulated conduit.

FIG. 4 is a graph showing the insulating performance of the vacuum insulated conduit of this invention, represented by Curve A, and also that of a conventional commercially available vacuum insulated conduit with multilayer radiation shielding, represented by Curve B. The data was calculated based on performance estimates for a vacuum insulated conduit similar to that of FIG. 2 having a two-inch diameter inner pipe, a length of 30 feet and one joint.

As can be seen, at very high vacuum of 10 microns mercury or less, both vacuum insulated conduits perform well. But as the vacuum degrades, the performance of the commercially available conduit is sharply compromised while that of the conduit of this invention continues at an acceptable level right up to and including total loss of vacuum.

Thus by the use of the vacuum insulated conduit of this invention one can achieve better insulation at less stringent vacuum conditions than were heretofore necessary thus achieving considerable cost savings. Since the vacuum need not be as stringent for comparable insulating performance, one can maintain the vacuum at less cost such as by employing adsorbent rather than an expensive getter package, such as barium or palladium oxide, in the evacuated space. Also, low cost atmospheric-type insulation is used in place of high cost radiation shielding. The atmospheric-type insulation effectively centers the inner pipe and, eliminates the need for spacers which are costly to construct and are a source of high heat leak. Furthermore, costly vacuum pumping time is considerably reduced. Still further, many costly and time consuming construction and maintenance techniques and procedures can be reduced or eliminated due to the lesser degree of vacuum which can be tolerated by the vacuum insulated conduit of this invention.

Although this invention has been described in detail with reference to certain preferred embodiments, it is appreciated that this invention comprises other embodiments which are within the spirit and the scope of the claims.

We claim:

1. A conduit having reduced thermal leakage at a joint area comprising:
   (A) a first pipe having an end thereof;
   (B) a second pipe having a diameter greater than that of said first pipe, positioned circumferentially around and axially along said first pipe, terminating at a point short of said first pipe end to define an axial distance from said point to said first pipe end;
   (C) bellows, attached at one axial end thereof to said first pipe, having a diameter greater than that of said first pipe but less than 25 percent of the distance between the first and second pipes, positioned circumferentially around and axially along said first pipe along, at least a part of, said axial distance; and
   (D) a plate having a solid radial dimension from the furthest radial extent of said bellows to said second pipe, substantially perpendicular to said pipes, connecting said bellows, at the other axial end thereof, with said second pipe and free from contact with said first pipe.

2. The conduit of claim 1 wherein the volume between the first and second pipes is packed with insulation.

3. The conduit of claim 1 wherein the volume between the first and second pipes contains adsorbent capable of adsorbing gas in said volume.

4. The conduit of claim 1 wherein the volume between the first pipe and the bellows is packed with insulation.

5. The conduit of claim 1 wherein the end of the first pipe is outfitted with a flange.

6. The conduit of claim 1 wherein the first pipe and the bellows are constructed of stainless steel, the second pipe and the plate are constructed of aluminum, and the plate is adhesive bonded to the bellows and welded to the second pipe.

7. The conduit of claim 1 wherein the first pipe, the bellows and the plate are constructed of stainless steel, the second pipe is constructed of aluminum, and the plate is adhesive bonded to the second pipe and welded to the bellows.

8. A conduit joint comprising the conduit of claim 1 attached to another such conduit at their respective ends.

9. The conduit joint of claim 8 wherein the joint area is encased by a sleeve.

10. The conduit joint of claim 9 wherein the volume encased by the sleeve is packed with insulation.

11. The conduit joint of claim 9 wherein the sleeve is sealed to the second pipe by a flexible water impermeable seal.

12. The conduit of claim 1 wherein the volume between the first and second pipes is at a pressure less than atmospheric.

13. The conduit of claim 12 wherein said pressure is from about 10 to 100,000 microns of mercury.

14. The conduit of claim 1 wherein said distance is from 5 to 20 percent.

15. The conduit of claim 1 wherein the bellows have a length of from 1 to 12 inches.

16. The conduit of claim 15 wherein said length is from 1.5 to 6 inches.

17. The conduit joint of claim 9 where the volume encased by the sleeve is evacuated.

18. The conduit joint of claim 9 where the volume encased by the sleeve is filled with a low conductivity gas.

* * * * *